(No Model.) 2 Sheets—Sheet 1.

E. BATLLE.
MACHINE FOR MAKING VEHICLE WHEELS.

No. 426,615. Patented Apr. 29, 1890.

Witnesses:
W. E. Poulter
E. Mc. Gallaher

Inventor:
Emilio Batlle
by Henry Orth
his atty (No Model.) 2 Sheets—Sheet 2.
E. BATLLE.
MACHINE FOR MAKING VEHICLE WHEELS.
No. 426,615. Patented Apr. 29, 1890.
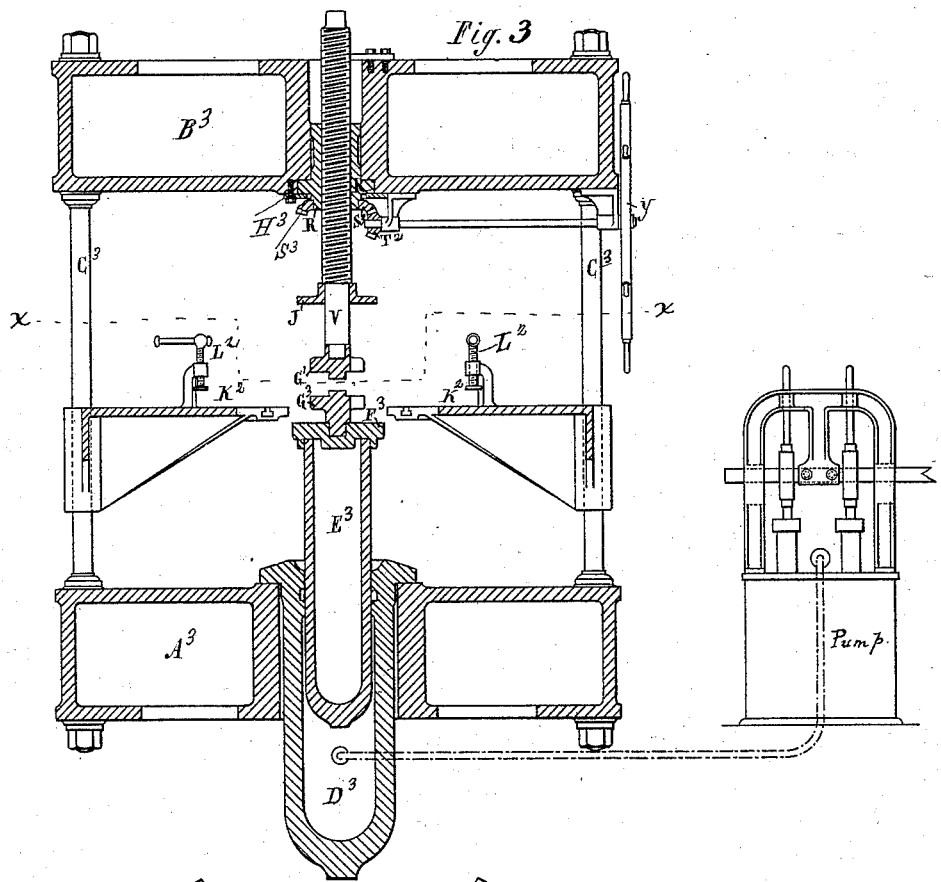
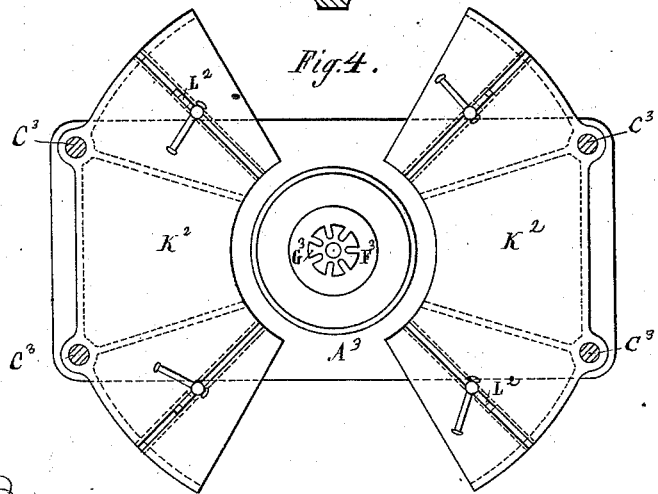

United States Patent Office.

EMILIO BATLLE, OF BARCELONA, SPAIN.

MACHINE FOR MAKING VEHICLE-WHEELS.

SPECIFICATION forming part of Letters Patent No. 426,615, dated April 29, 1890.

Application filed October 11, 1887. Serial No. 252,031. (No model.) Patented in Spain March 1, 1887, No. 6,744, and in France August 25, 1887, No. 185,484.

*To all whom it may concern:*

Be it known that I, EMILIO BATLLE, a citizen of the Kingdom of Spain, residing at Barcelona, Spain, have invented certain new and useful Improvements in Machines for Making Vehicle-Wheels, (said invention having been patented in Spain, March 1, 1887, Patent No. 6,744, and in France, August 25, 1887, Patent No. 185,484;) and I do hereby declare the following to be a full, clear, and exact description of the same, reference being had to the accompanying drawings, forming a part of this specification, and to the letters of reference marked thereon, My present invention relates to machines for making or putting together vehicle-wheels embodying novel features of construction, the wheel the machine is particularly adapted to form being described and claimed in another pending application, Serial No. 271,199, filed April 19, 1888.

Figure 1:
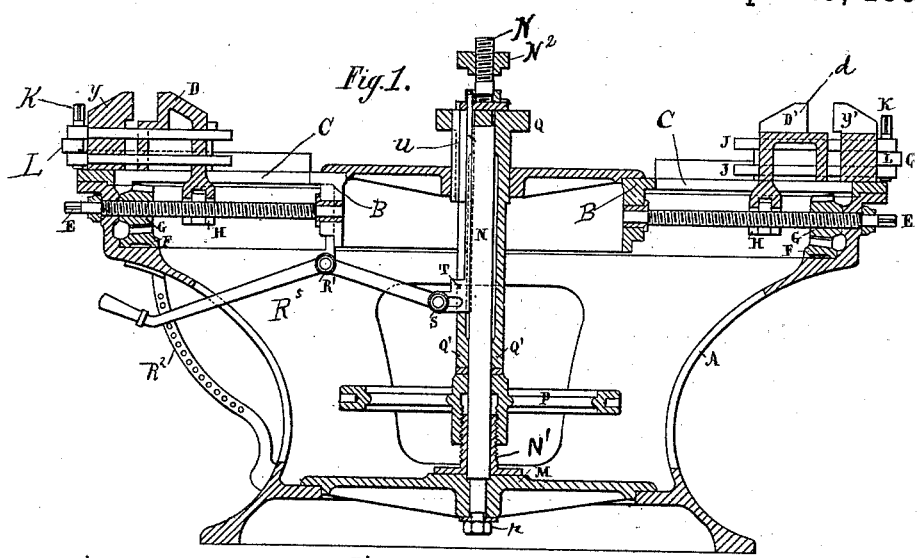
Figure 2:
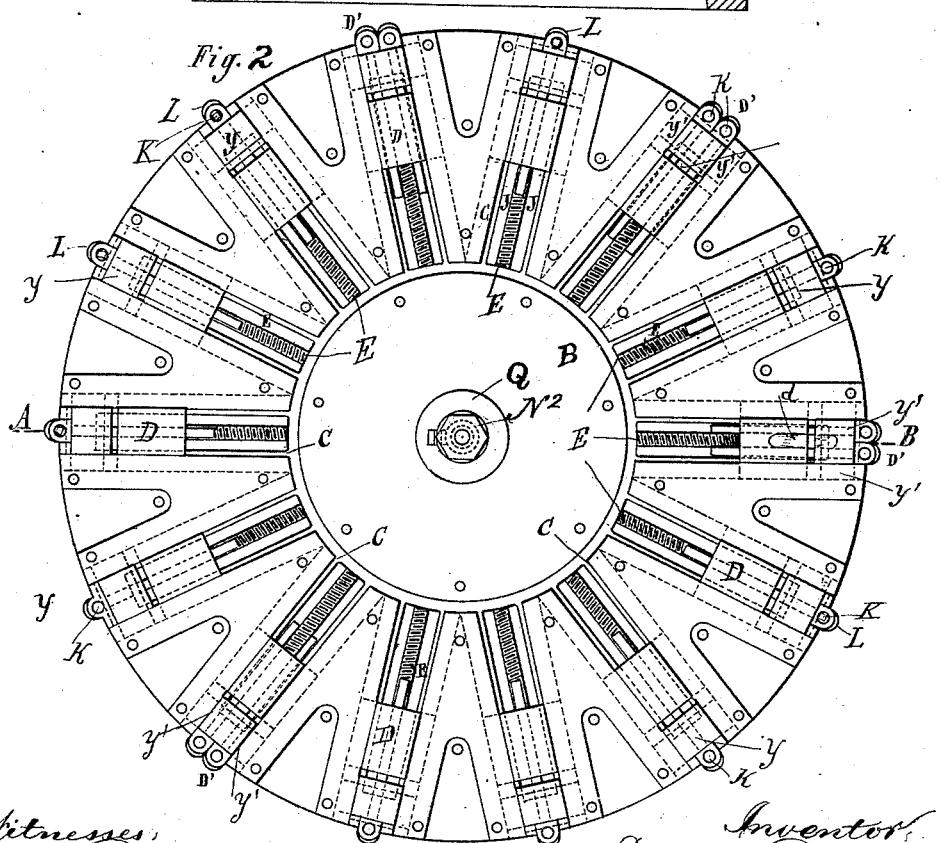

In the accompanying drawings, Figure 1 is a vertical section of the machine for assembling the wheel. Fig. 2 is a plan of the same;
Fig. 3, a vertical section of a hydraulic press employed in the operation; and Fig. 4, a horizontal section of the same on line $x$ $x$, Fig. 3.

The machine for fitting together the different parts of a wheel—such, for instance, as described in my before-mentioned application, as shown in Figs. 1 and 2—consists of a suitable frame A, surmounted by a table B, provided with a series of guides C, in which are arranged a series of carriages D, adapted to be moved by screws E, engaging a threaded portion or nut H, depending therefrom. Each of these screws E is provided with a bevel-pinion G, having a threaded interior engaging the thread of screws E, said pinions meshing with a bevel-wheel mounted on frame A, so that when one of the screws E is turned all the others will be simultaneously operated and the carriages moved in or out. The upper portions of these carriages D constitute the fixed jaw of a clamp, the other jaws Y being mounted on rods J J, secured at their inner ends to the jaw or carriage D, and having in their outer ends eyes or bearings, in which operates the shaft K, having the cam L thereon adapted when the shaft is turned to abut against the jaw Y and draw it toward the carriage or jaw D, thus clamping the rim between them, both jaws of the clamp, it will be seen, being shifted simultaneously in and out by the screws, the outer jaw, however, being adjustable independently of the inner jaw, so as to clamp different-sized fellies. If desired, the upper portion of the carriage D may be grooved, as at $d$, for the reception of a spoke, in which case it is desirable to employ two movable jaws Y' Y', as shown.

It will be understood that the carriage in the present instance forms one of the jaws of a clamp; but this is not necessary, and the carriage with a clamp thereon is regarded as the equivalent of this.

As it is desirable to form the wheels with a certain degree of concavity or dish, the following-described apparatus is designed to accomplish this purpose. On a cross-rail M of the frame A is mounted a vertical cylindrical screw-threaded projection N', onto which fits the female screw of a hand-wheel P, surmounted by a hollow sleeve or shaft Q' in the center of the machine. Near the top this shaft is provided with a flange Q, operating as the support for the inner end of the spokes during the operations. Passing through the sleeve Q' and nut N' is a central shaft N, secured rigidly to the cross-rail M at the bottom by means of a nut $n$, or otherwise, and extending some distance above the flange Q, its upper end being screw-threaded and provided with a nut $N^2$, which may be screwed down upon the inner ends of the spokes to clamp them while the bolts, &c., are being applied.

In operating this part of the apparatus the sleeve and flange are set up to the proper point to give the desired dish to the wheel by means of the hand-wheel P, before or after which the spokes are put in position. Then the nut $N^2$ is screwed down, and the ends of the spokes firmly clamped while the bolts, &c., are being applied.

To secure the wheel from rotary motion on shaft N, I provide a keyway in shaft Q' or flange Q, in which slides a vertically-movable key $u$, arranged, when projected, to engage the keyway in the disk forming part of the hub of the wheel described in my before-mentioned application. The key is raised and lowered by means of a lever R⁵, pivoted at R' to the frame, and connected at one end by pin S and slotted block T to the key, and it is held in adjusted position by co-operating with a suitable slotted or perforated quadrant R², as shown.

As it is desirable to employ hydraulic pressure to compress the central portion of the wheel being made between the disks, a hydraulic press may be employed instead of the mechanism just described, a convenient form being as follows:

Referring to Figs. 3 and 4, A³ represents the bed-plate, and B³ the top plate, supported by the four standards C³.

In the bed-plate A³ is arranged the cylinder D³ with the piston E³ operating therein. On the top of the cylinder is a flange F³, into which is inserted the support G³ for the center of the wheel, this support being star-shaped and having grooves corresponding to the bolts, which are already inserted through the hub-disks of the wheel.

Through the center of the top of the press passes a screw V, passing also through a loose nut R, connected with the top of the press by a ring H³. This nut carries a bevel-wheel S³, which gears with a bevel-pinion T², fixed to a shaft provided with a hand-wheel, so that the screw can be raised or lowered at will. At the lower end the screw is provided with a support or stamp G', similar to that on the top of the piston E³.

For the sake of convenience in illustration, the carriages D are not shown in Figs. 3 and 4, the rim of the wheel being supported in brackets K², fixed to the standards of the press and held on the brackets by means of vises L². When the wheel is placed in the brackets and the hub and flanges properly positioned at the center, the screw V is lowered to the proper point and the press operated to elevate the center of the wheel and give the proper dish, at the same time forcing the flanges, hub, and spoke ends into their proper relative positions and holding them so until the bolts or screws are inserted.

I do not wish to limit myself to the use of the machine for assembling vehicle-wheels of the specific construction described in my before-mentioned application, as said machine may be employed for assembling wheels of other constructions.

I claim—

1. In a machine for assembling the parts of a wheel, the combination, with the central clamp for the inner ends of the spokes, of the series of radially-sliding clamps for grasping both sides of the felly, and the screws for moving said clamps, geared together to move simultaneously.

2. In a machine for assembling the parts of a wheel, the combination, with the central vertically-adjustable clamp for the inner ends of the spokes, of the series of radial carriages or clamps for the felly, whereby the concavity of the wheels formed may be varied, and the vertically-movable key for engaging the wheel to prevent rotary movement, substantially as described.

3. In a machine for assembling the parts of a wheel, the combination, with the vertically-adjustable screw-clamp for the inner ends of the spokes, and the radially-movable and independently-adjustable jaws for grasping both sides of the felly, of the screws for moving said clamps bodily, having the bevel-pinions thereon, and the gear-wheel engaging said bevel-pinions for causing the simultaneous movement of all the clamps, substantially as described.

4. In a machine for assembling the parts of a wheel, the combination, with the central vertically-adjustable clamp for the inner ends of the spokes, of the series of radially-adjustable clamps arranged to grasp both sides of the felly, and connections between said clamps for moving them bodily simultaneously, substantially as described.

5. In a machine for assembling the parts of a wheel, the combination, with the radially-disposed screw-shafts, of the clamps for the felly, each having a jaw engaging one of the screw-shafts and a jaw adjustably connected thereto, whereby the felly may be grasped and held from movement in every direction, substantially as described.

6. In a machine for assembling the parts of a wheel, the combination, with the central clamps for the hub, of the radially-adjustable clamps for the felly, each having the inner and outer jaws adjustable toward each other and the notch or cut-away portion for the spokes, substantially as described.

In testimony whereof I have hereunto set my hand in the presence of the two subscribing witnesses.

EMILIO BATLLE.

Witnesses:
 JOSÉ DAFFARI,
 ENRIQUE PAGÉS.